(12) United States Patent
Klaassen (10) Patent No.: US 6,400,534 B1
(45) Date of Patent: Jun. 4, 2002

(54) RESISTIVE SHUNT ESD AND EOS PROTECTION FOR RECORDING HEADS

(75) Inventor: Erno Hilbrand Klaassen, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,722

(22) Filed: Mar. 21, 2000

(51) Int. Cl.$^7$ ................................................. G11B 5/33
(52) U.S. Cl. ........................................ 360/323; 360/326
(58) Field of Search ................................. 360/323, 322, 360/326, 327.21; 29/603

(56) References Cited

U.S. PATENT DOCUMENTS

| | | | |
|---|---|---|---|
| 4,317,149 A | | 2/1982 | Elser et al. ................... 360/126 |
| 4,800,454 A | | 1/1989 | Schwartz et al. ............. 360/103 |
| 5,465,186 A | | 11/1995 | Bajorek et al. .............. 360/113 |
| 5,491,605 A | | 2/1996 | Hughbanks et al. ......... 360/113 |
| 5,757,590 A | * | 5/1998 | Phipps et al. ................ 360/113 |
| 5,757,591 A | * | 5/1998 | Carr et al. ................... 360/113 |
| 5,834,952 A | * | 11/1998 | Ngo ............................. 327/54 |
| 5,852,521 A | * | 12/1998 | Umeyama et al. ............ 360/46 |
| 5,877,933 A | * | 3/1999 | Johansen et al. ........... 361/220 |

* cited by examiner

Primary Examiner—Allen Cao
Assistant Examiner—Dzung C. Nguyen
(74) Attorney, Agent, or Firm—Lumen Intellectual Property Services, Inc.

(57) ABSTRACT

In a magnetic read/write assembly, the magnetoresistive (G)MR sensor element is protected against electrostatic discharge (ESD) and electrical overstress (EOS) by using a low resistance bypass. The low resistance bypass shunts current away from the magnetoresistive sensor element during an ESD or EOS event. This low resistance bypass is made up of two or more resistors connected in series, and positioned in parallel to the magnetoresistive sensor element. The use of electronic circuitry to temporarily disable this low resistance bypass allows the magnetoresistive sensor element to be tested during manufacturing. The low resistance bypass is removed prior to placing the (G)MR head into operation in the magnetic storage system or at any other desired step in the manufacturing process.

17 Claims, 5 Drawing Sheets

RESISTIVE SHUNT ESD AND EOS PROTECTION FOR RECORDING HEADS

FIELD OF THE INVENTION

The present invention relates to electrical protection circuitry for magnetic disk drives and more particularly circuitry to protect against electrostatic discharge (ESD) and electrical overstress (EOS) in read/write transducers utilizing magnetoresistive read sensors.

DESCRIPTION OF THE RELATED ART

Magnetic head disk drive systems have been widely accepted in the computer industry as a cost-effective form of data storage. In a magnetic disk drive system, a magnetic recording medium in the form of a disk rotates at high speed while a magnetic read/write transducer, referred to as a magnetic head, "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few tens of nanometers or less and is primarily a function of disk rotation, the aerodynamic properties of the slider assembly and the force exerted by the spring-loaded actuator arm.

A major problem that is encountered during manufacture, handling and use of magnetic recording transducers, referred to as heads, is the buildup of electrostatic charges on the various elements of a head or other objects which come into contact with the heads, particular heads of the thin film type, and the accompanying spurious discharge of the static electricity thus generated. Static charges may be produced for example by the presence of certain materials, such as plastics, during manufacture and subsequent handling of the heads. These static charges arc across the edge of the insulating layer between the magnetic pole tips and adjacent conductive layers which are exposed and positioned adjacent to the transducing gap at the air bearing surface facing the recording medium thus causing erosion of the pole tips and degradation of the transducer in reading and writing of data.

Magnetoresistive sensors, also referred to as "MR heads," are particularly useful as read elements in magnetic transducers, especially at high data recording densities. The MR sensor provides a higher output signal than an inductive read head. This higher output signal results in a higher signal-to-noise ratio for the recording channel and allows higher areal density of recorded data on a magnetic disk surface.

As described above, when an MR sensor is exposed to ESD, or even a voltage or current input larger than that intended under normal operating conditions, referred to as electrical overstress or EOS, the MR sensor and other parts of the head may be damaged. This sensitivity to electrical damage is particularly severe for MR read sensors because of their relatively small physical size. For example, an MR sensor used for extremely high recording densities will have a cross-section of 100 Angstroms (.ANG.) by 1.0 micrometers (um) or smaller. Discharge of voltages of only a few volts through such a physically small sensor, behaving like a resistor, is sufficient to produce currents capable of severely damaging or completely destroying the MR sensor. The nature of the damage which may be experienced by an MR sensor varies significantly, including complete destruction of the sensor via melting and evaporation, contamination of the air bearing surface, generation of shorts via electrical breakdown, and milder forms of damage in which the head performance may be degraded.

Prior solutions to ESD and EOS protection can be summarized into two types of approaches: 1) by using diode(s) and 2) by shorting out the MR sensor element. However, both of these approaches have significant disadvantages. In the diode approach, the diode is intended to remain in parallel with the MR sensor element during normal operation of the disk drive. The current flowing through the diode during normal operation must be small in order for the diode to not affect the operating effectiveness of the MR sensor element. Common bias voltages for MR heads are in the range of 350 mV to 700 mV, which is the regime over which a diode begins to conduct current. This leaking current through the diode leads to shot noise, which will lower the signal to noise ratio of the readback process. Diodes also introduce parasitic capacitance across the head, and from the head leads to the ground, which adversely affects the maximum readback bandwidth achievable with the head. Moreover, modern generations of Giant Magnetoresistive (GMR) heads are so sensitive to ESD, the diode is not sufficiently forward biased to shunt enough current away from the MR sensor element even for low ESD voltages.

Shorting out the MR sensor element, on the other hand, provides the best possible ESD protection. The problem with this technique is that it is no longer possible to test the MR head after the short is applied. Ideally, the short is applied early in the MR head fabrication process, and not removed until the disk drive is assembled. Due to the value added to the MR head as it goes through wafer fabrication, slider fabrication, suspension mounting, and head stack assembly (HSA) build, it is beneficial to be able to test the MR head at various points.

Elser et al. U.S. Pat. No. 4,317,149 discloses an inductive head having short discharge paths formed by the deposition of conductive material in recesses formed in an insulating layer so that the static electric discharge will occur in areas displaced from the critical pole tip and gap area at the slider air bearing surface. Schwartz et al. U.S. Pat. No. 4,800,454 discloses an inductive head assembly wherein the magnetic pole piece and the inductive coil winding are coupled to the slider to allow discharge of any static electric charges which may build up. The winding is connected to the slider body via a diode with high forward and reverse voltage drops, or through a fusible link.

U.S. Pat. No. 5,465,186 describes an approach for protecting a magnetic read/write transducer from the effects of electrical overstress and electrostatic discharge by shorting out the conductive leads of a magnetoresistive (MR) sensor element to provide a low resistance, conductive path that bypasses the MR element and minimizes electrical current through the MR sensing element during discharge of static electrical charge. The MR sensor lead terminal pads are shorted together by soldering or by using twisted conductor pairs. The other transducer elements such as the MR magnetic shields, the inductive coil and the inductive magnetic yoke structure may also be shorted to the MR sensor leads by soldering the lead terminal pads together at the slider surface. Remotely located protective devices, such as reversed diode pairs, can also be connected across the MR sensor element using the twisted pair. The short is removed prior to placing the MR head into operation in the magnetic storage system.

U.S. Pat. No. 5,491,605 describes a scheme for protecting a magnetic read/write transducer from EOS and ESD. The elements of the MR and inductive heads are shorted together and to the slider substrate by depositing a conductive material layer, such as tungsten, over the slider air bearing surface to provide a low resistance, conductive path that minimizes current through the MR element during discharge of electrostatic charge. The conductive layer is removed by wet etching prior to placing the magnetic head into operation in a magnetic storage system.

A switchable short was described in U.S. Pat. No. 5,465,186 that would allow the short to be temporarily opened for testing. However, this method is difficult to realize, as switches require large amounts of real estate on the back of the slider, and the switching process requires low resistance shorting and re-shorting structures. Switches can also be expected to last for only a limited number of opening and closing cycles.

A need therefore exists for providing an MR read/write head assembly with ESD and EOS shunt protection during manufacturing that would allow the MR read/write head to be tested at various manufacturing stages.

SUMMARY OF THE INVENTION

A principle objective of the present invention is to minimize the damage to an (G)MR sensor caused by the discharge of electrostatic discharge through or electrical overstress of the (G)MR sensor element, by using resistors to provide a low resistance bypass to the (G)MR sensor.

The other objective of the present invention is to provide a method for protecting the (G)MR sensor from ESD and EOS damage but at the same time allow the (G)MR sensor element to be tested at various stages in the manufacturing process.

In view of the foregoing objects, the present invention provides a low resistance bypass that shunts electrostatic discharge and electrical overstress from the (G)MR sensor element during a discharge. The low resistance bypass is achieved by connecting one or more resistors in series, across and in parallel to the (G)MR sensor element. The resistors, resistor leads, or both the resistors and leads are removed from across the head at an appropriate step during the manufacturing process.

The present invention also provides a method that would allow the (G)MR sensor element to be tested at the desired stages during the manufacturing process. By using appropriate electronic circuitry, the low resistance bypass can be temporarily disabled, i.e. no current is allowed to flow through it, thereby allowing the (G)MR sensor element to be tested.

In an embodiment of the present invention, thin film resistors are deposited during the (G)MR head fabrication across and in parallel to the (G)MR sensor element. These resistors are removed at a desired step during the manufacturing process. When testing is desired, an electronic circuitry can be externally connected to the low resistance bypass to temporarily disable the bypass. The removal of the electronic circuitry would re-enable the low resistance bypass.

BRIEF DESCRIPTION OF THE DRAWINGS

The foregoing and other objects, features and advantages of the present invention will be apparent from the following detailed description of the preferred embodiments of the invention, reference being made to the accompanying drawing, in which like reference numerals indicate like parts and in which.

DETAILED DESCRIPTION OF THE EMBODIMENTS

Figure 1:
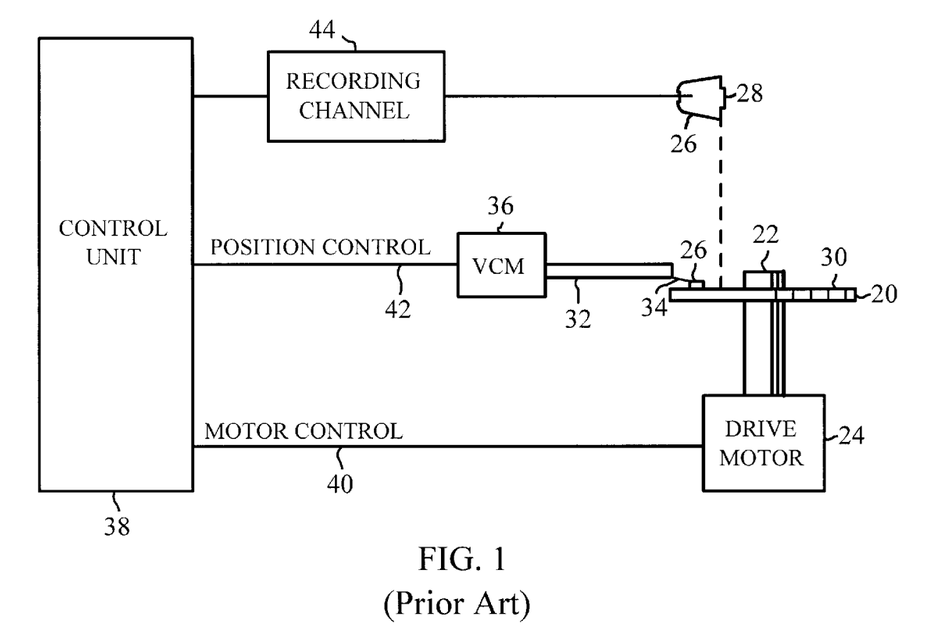
FIG. 1 is a simplified block diagram of a magnetic disk storage system.

Although the invention is described as embodied in a magnetic disk storage system, the invention also applies to other magnetic recording systems and applications using a sensor to detect a magnetic field, such as magnetic tape recording systems for example. Referring to prior art FIG. 1, a magnetic disk storage system comprising at least one rotatable magnetic disk 20 is supported on a spindle 22 and rotated by a disk drive motor 24 with at least one slider 26 positioned on the disk 20. Each slider 26 supports one or more magnetic read/write transducers 28, typically referred to as read/write heads. The magnetic recording media on each disk is in the form of an annular pattern of concentric data tracks (not shown) on disk 20. As the disks rotate, the sliders 26 are moved radially in and out over the disk surface 30 so that the heads 28 may access different portions of the disk where desired data is recorded. Each slider 26 attaches to an actuator arm 32 by means of a suspension 34. The suspension 34 provides a slight spring force which biases the slider against the disk surface 30. Each actuator arm 32 attaches to an actuator means 36. The actuator means as shown in FIG. 1 may be a voice coil motor (VCM), for example. The VCM comprises a coil moveable within a fixed magnetic field. The controller supplies motor current signals to control the direction and acceleration of the coil movements.

During operation of the disk storage system, the rotation of the disk 20 generates an air bearing between the slider 26 and the disk surface 30 which exerts an upward force or lift on the slider. The air bearing thus counterbalances the slight spring force of the suspension 34 and supports the slider off and slightly above the disk surface a small, substantially constant spacing during operation.

The various components of the disk storage system are controlled in operation by control signals generated by control unit 38, such as access control signals and internal clock signals. Typically, the control unit 38 comprises logic control circuits, storage means and a microprocessor, for example. The control unit 38 generates control signals to control various system operations such as drive motor control signals on line 40 and head position and seek control signals on line 42. The position control signals 42 provide the desired current profiles to optimally move and position a selected slider 26 to the desired data track on the associated disk 20. A recording channel 44 communicates read and write signals to and from the read/write heads 28.

The above description of a typical magnetic disk storage system, and the accompanying illustration of FIG. 1 are for representation purposes only. Disk storage systems may contain a large number of disks and actuators, and each actuator may support a number of sliders.

Figure 2A:
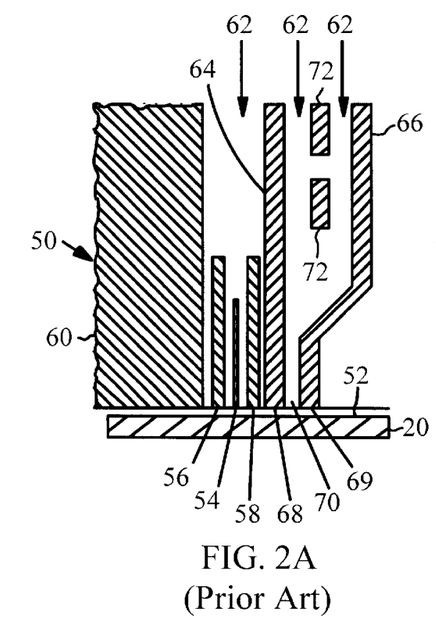
FIGS. 2A and 2B are cross-sectional views of MR read/inductive write magnetic transducers.
Figure 2B:
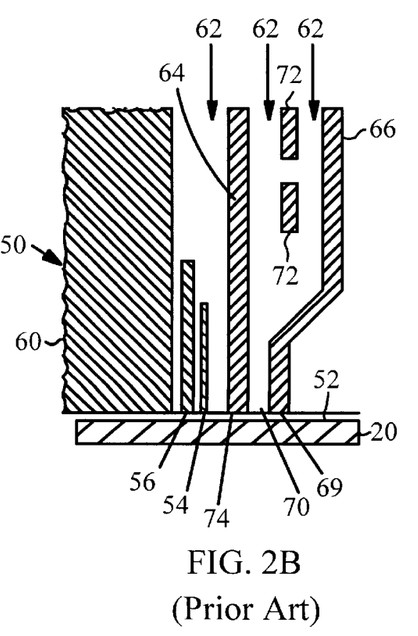

Referring now to prior art FIGS. 2A and 2B, a portion of an (G)MR read/inductive write magnetic head or magnetic head assembly or head 50 is shown in transducing relationship with a rotating magnetic disk 20 such that the head air bearing surface 52 (ABS) is disposed in facing relationship with and slightly above the disk recording surface. Generally, such a magnetic head assembly 50 includes an (G)MR read assembly and an inductive write assembly formed adjacent to one another on a substrate surface. The substrate surface is typically the vertical surface forming the trailing end of the slider 26 carrying the magnetic head. A traditional MR read assembly comprises an anisotropic magnetoresistive (AMR) sensing element 54 fabricated of a ferromagnetic material, such as nickel-iron (NiFe) alloy, for example, which is enclosed by first and second magnetic shield elements 56 and 58, respectively. In a more advanced giant magnetoresistive (GMR) head, the magnetic sensing element 54 comprises of a multilayer magnetic structure, including magnetic bias layers, of the type described in commonly assigned U.S. Pat. No. 4,785,366 or of the type described in commonly assigned U.S. Pat. No. 5,206,590. This multilayer magnetic structure consists of a conducting layer sandwiched by two magnetic layers, one of which has a fixed magnetization. The other magnetic layer's magnetization is free to change, affected by an external magnetic field. By utilizing the spin direction of electrons transversing these three layers, a giant MR effect is created. The shield elements 56 and 58 are generally made of a highly permeable magnetic material, such as NiFe or Sendust, a trialloy of aluminum-silicon-iron. The magnetic shield elements 56 and 58 minimize or eliminate magnetic interferences from affecting the (G)MR sensing element 54 and thereby producing extraneous electrical pulses. Conductive leads, of tantalum (Ta) or copper (Cu) or other suitable conductive material, attached electrically at the end portions of the (G)MR element 54 couple the (G)MR sensing element to external circuitry to provide a means for sensing the resistance of the (G)MR sensing element.

The (G)MR read assembly is formed by well-known vacuum deposition techniques, such as sputter deposition, for example, on the substrate 60. Layers 62 of insulating material surround and insulate the various elements of the (G)MR assembly from each other. For example, the layers 62 are made from silicon dioxide ($SiO_2$) or aluminum oxide ($Al_2O_3$).

The inductive write assembly comprises a lower or first pole piece 64 and an upper or second pole piece 66. The first and second pole pieces 64, 66 are made of a highly permeable magnetic material such as NiFe, for example. The first and second pole pieces 64, 66 form a magnetic circuit magnetically connected together at a back gap portion (not shown) with the first and second pole tips 68, 69 forming a magnetic gap 70 at the air bearing surface 52. One or more layers of electrical conductors 72, generally made of Cu, for example, form a write coil 72 disposed between the first and second pole pieces 64, 66. The write coil 7:2 also connects to external circuitry via conductive leads. The pole pieces 64, 66 and the write coil conductors are fabricated by well-known processes such as electroplating or sputter deposition, for example. Layers 62 of insulating material electrically insulate the pole pieces from the write coil and the (G)MR read assembly. In addition, a capping layer 62 of insulating and protective material covers the entire assembly.

The magnetic head assembly 50 shown in FIG. 2a is sometimes referred to as a "piggyback" head. FIG. 2b shows an alternate configuration referred to as a "merged" head where the second (G)MR magnetic shield element 58 is merged with the inductive assembly first pole piece 68 to form a single element 74 which performs both functions.

While the write coil conductors 72 can withstand relatively high voltages and currents, the (G)MR sensing element is particularly sensitive to current and voltage overloads because of its physically small cross-section. The active sensing portion of the (G)MR element has a length in the range of 0.1 to 20 um, a height (width) of 0.1 to 5 um and a thickness of 10 to 100 nanometers (nm) and a resistance of about 20 to 80 ohms. In (G)MR read assemblies of the types shown in FIGS. 2A and 2B, damage occurs along the sensing region of the (G)MR sensing element 54 when the accumulated static charge is discharged through the (G)MR sensing element 54 or from the (G)MR sensing element to the magnetic shield elements, first pole piece, the slider body (substrate), or through the pads on the back of the slider body used to make the electrical connection to the head.

Figure 3:
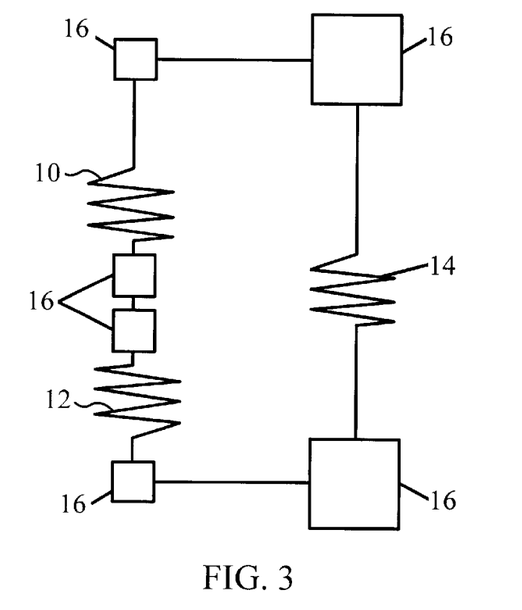
FIG. 3 is a simplified schematic illustrating two resistors connected in series, across and in parallel to the MR sensor element according to the present invention.

FIG. 3, illustrates a schematic diagram of one embodiment of the present invention. Two resistors, 10 and 12, are connected in series, across and in parallel with the (G)MR head, represented by resistor 14. The resistors 10 and 12 form a low resistance bypass that provides the protection against electrostatic discharge (ESD) or an electrical overstress (EOS) by shunting current away from the (G)MR head 14. Electrical probing points 16 are provided at the nodes between the individual resistors, as well as the endpoints of the resistors. These probing points may consist of separate electrically conductive pads, or may consist of two probing locations on a single such pad.

Using a nonzero shunt resistance provides two different approaches to the testability of the (G)MR head. In the simplest approach, the resistance of the traces used to make resistors 10 and 12 is measured in various spots on the wafer by using test structures. These test structures are made of the same material as the resistors with the same shape and size in order to allow a close estimate of the resistance of the resistors 10 and 12. Once the test structure's resistance is known, the resistance value of the resistors 10 and 12 surrounding these test structures is known with reasonably accuracy. The effects of the resistors 10 and 12 can be removed from the measurements of resistance and amplitude during the testing of the (G)MR head by calculation of the value of the (G)MR resistor 14.

Figure 4:
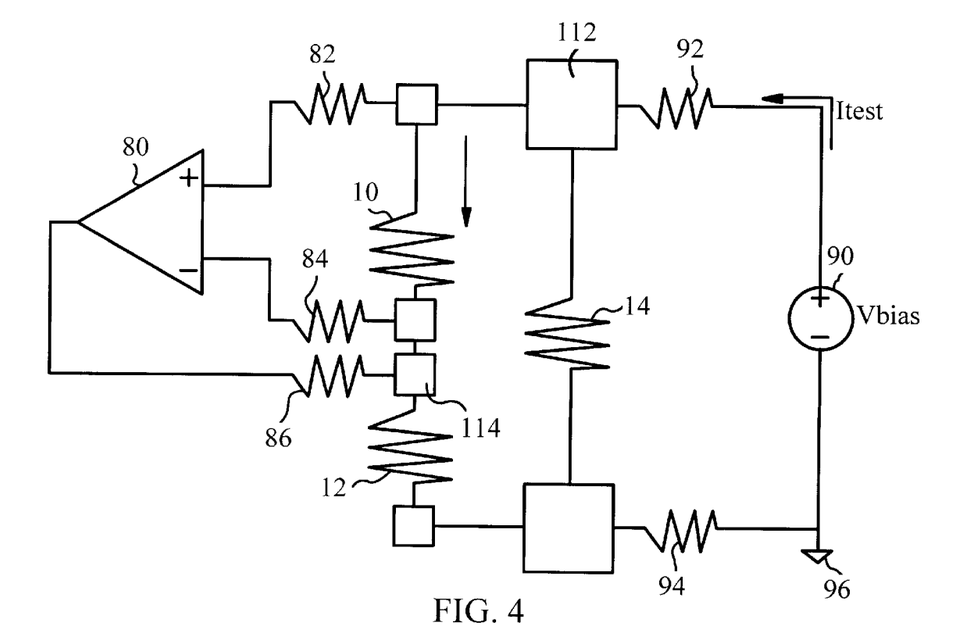
FIG. 4 is a simplified schematic illustrating the use of an operational amplifier that allows the MR sensor element to be tested according to the present invention.

An alternative embodiment is illustrated in FIG. 4. This schematic shows the method of using an operational amplifier 80 to disable the low resistance bypass to allow for the testing of the (G)MR head 14 in the present invention. Testing of the (G)MR head commonly involves connecting an external test and bias voltage 90 across the (G)MR head and the current flowing out of this external source is measured for both amplitude and resistance value measurements.

In this configuration, an external test and bias voltage 90 is placed across the (G)MR head 14. The negative node of the bias voltage is held at ground 96 and only the current flowing out of the positive side of the bias source is measured. The inputs of the operational amplifier are connected in parallel to the endpoints of the top resistor 10, the non-inverting input to the positive endpoint of the top resistor and the inverting input to the negative endpoint. The output of the op-amp 80 is connected to the negative endpoint of the top resistor 10 where the inverting input is also connected. By using an op-amp in this configuration, a negative feedback loop is created driving the voltage across the top resistor 10 to be zero. When the voltage across the top resistor is zero, no current is allowed to flow through the top resistor. When the op-amp 80 is connected in this manner, the low resistance bypass is temporarily disabled. All the test current that is measured will flow through the (G)MR head 14.

If op-amp 80 has the ability to generate a negative voltage with respect to ground 96 at its output, then the bias source 90 can have both positive or negative values.

The op-amp 80 drives the voltage at node 114 to the same potential as node 112. While this causes zero voltage drop across resistor 10, the full voltage across (G)MR head 14 develops across resistor 12. This will cause a current to flow through resistor 12, through contact resistance 94, and down into ground point 96.

When the op-amp 80 is removed from the top resistor 10, the voltage across the top resistor is allowed to change freely and current can once again flow through the top resistor and the low resistance bypass has been re-enabled.

The effects of contact resistance are shown as resistors 82, 84, 86, 92, and 94. Since the inputs of the operation amplifier essentially have no current flow, there is no voltage drop across resistors 82 and 84. The negative feedback loop accounts for the voltage drop that will occur across resistor 86. Since the bias voltage 90 is by definition constant, the voltage across the resistor 10 will not vary rapidly (to first order DC).

Figure 5A:
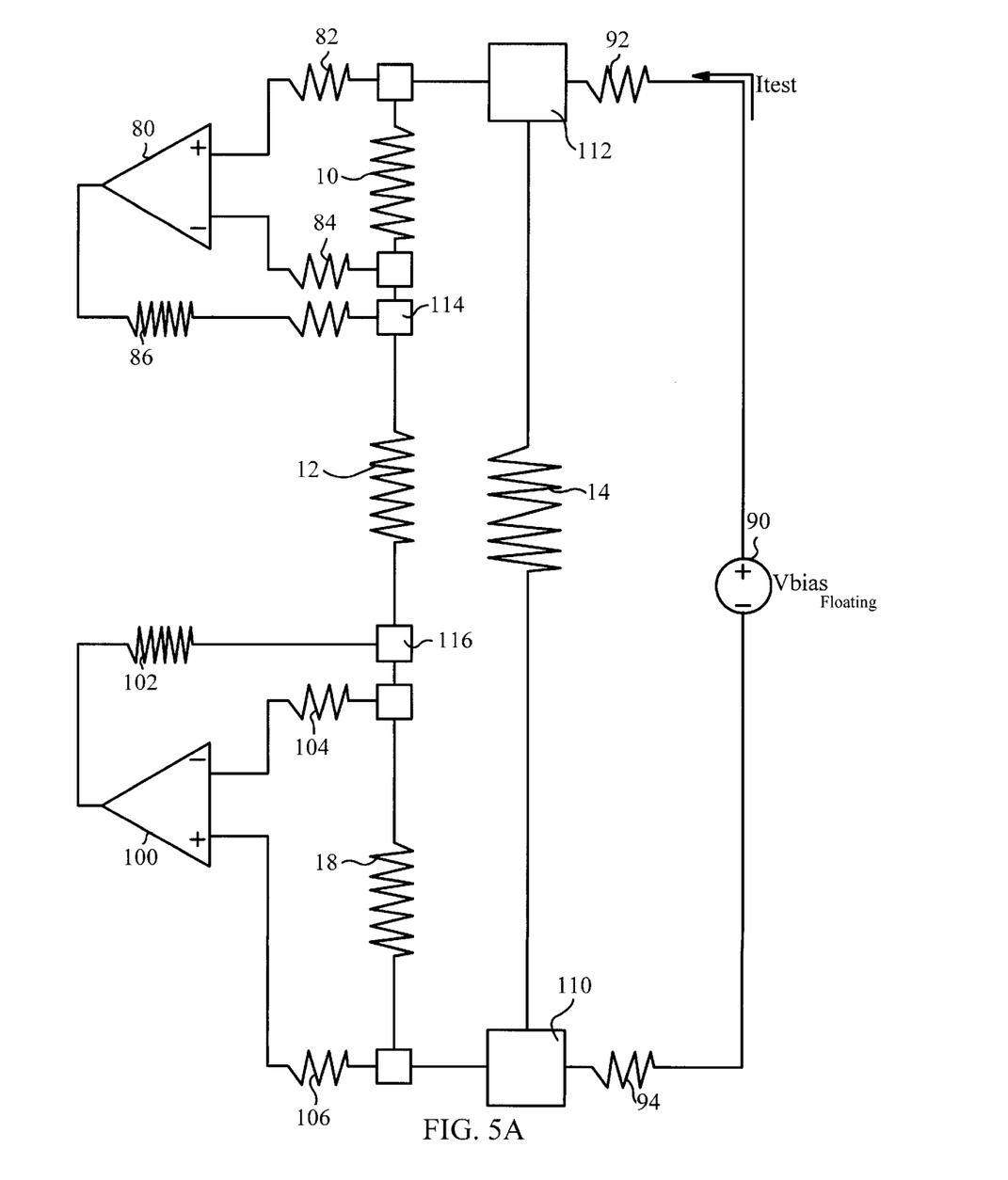
FIG. 5A is a simplified schematic illustrating the use of two operational amplifiers that allow the MR sensor element to be tested according to the present invention.

Referring to FIG. 5A, the schematic illustrates the embodiment that can be used when a differential measurement is required with a floating bias source 90 (i.e. neither node of the bias source is grounded) where the current through the bias source is the measured value.

This embodiment involves the use of three resistors, 10, 12, and 18, which are connected in series, across and in parallel to the (G)MR head 14. The basic principle regarding the low resistance bypass for ESD shunting is the same as the two-resistor embodiment. The three resistor creates the same kind of bypass as the two resistor embodiment. Two op-amps 80 and 100 are used. Op-amp 80 is connected to the top resistor 10 and op-amp 100 is connected to the bottom resistor 18. The top op-amp 80 creates a negative feedback loop as described in the two resistor embodiment to drive the voltage across the top resistor 10 to be zero. This prevents the current from flowing through resistor 10 from the top of the bias source 90.

The second op-amp 100 is used to prevent current from flowing through resistor 18 and back into the bottom of the bias source 90 (through contact resistance 94). The op-amp 100 is connected across the bottom bypass resistor 18. The non-inverting input of op-amp 100 is connected to the bottom endpoint of the bottom resistor 18 and the inverting input is connected to the top endpoint. The output of the bottom op-amp 100 is connected to node 116 where the inverting input of the op-amp 100 is also connected. The bottom op-amp creates a negative feedback loop driving the voltage drop across the bottom resistor 18 to be zero, preventing current from flowing through resistor 18.

With the op-amps 80 and 100 connected in this configuration, op-amp 80 will drive node 114 to the same potential as node 112, and op-amp 100 will drive node 116 to the same potential as node 110. As a result, the voltage between nodes 110 and 112, which is the voltage across (G)MR head 14, will develop across resistor 12, and cause current to flow through bypass resistor 12. However, no current flows through resistors 10 and 18, causing all the current from the bias source 90 to flow through the (G)MR head 14 and back into the opposite side of the bias source 90.

When both op-amps are removed, the low resistance bypass is re-enabled.

Figure 5B:
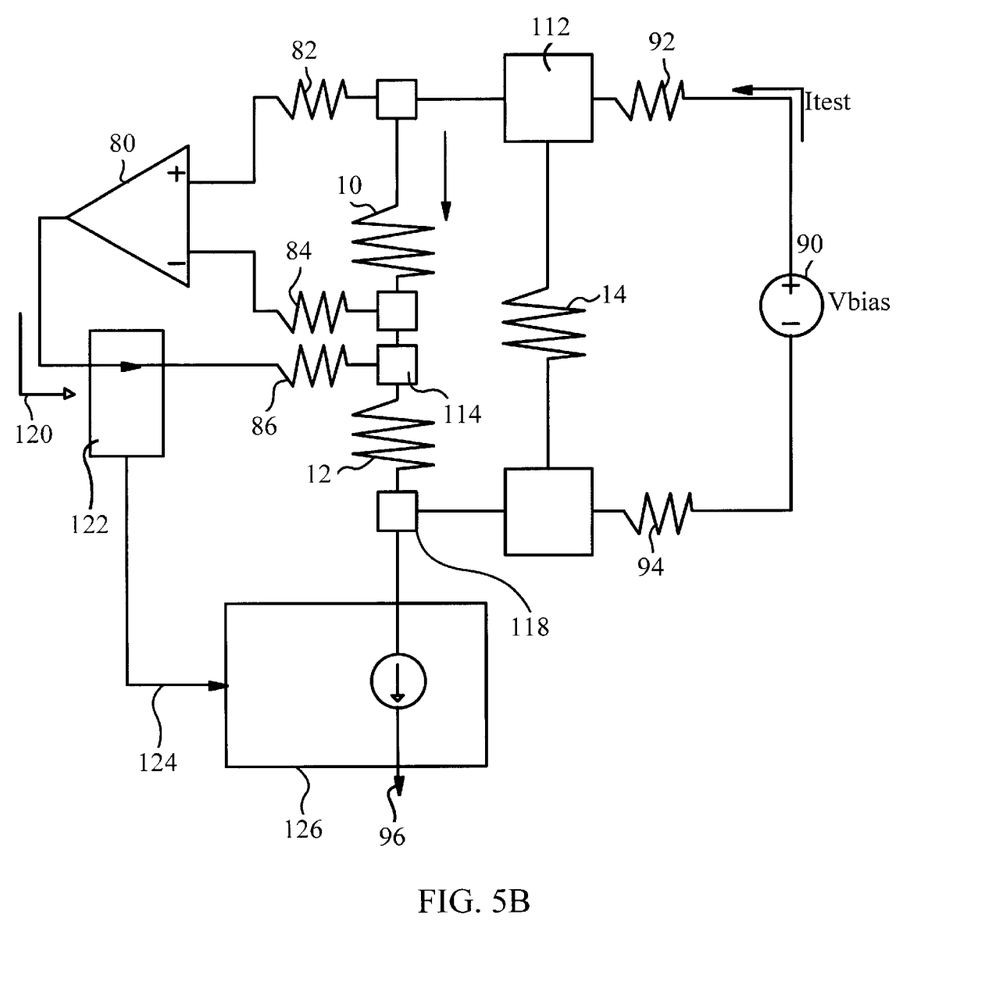
FIG. 5B is simplified schematic illustrating the use of current drawing circuit to allow the MR sensor element to be tested according to the present invention.

The embodiment shown in FIG. 5B is an alternative embodiment of the present invention when a differential measurement is required with a floating bias source where the current through the bias source is the measured value.

Op-amp 80 is connected across bypass resistor 10 and drives the voltage at node 114 to equal the voltage at node 112. This will cause zero voltage drop across resistor 10, and hence prevent the current flowing out of bias source 90 to flow through resistor 10. Op-amp 80 injects a current 120 into node 114 which will flow through the bottom resistor 12. The current 120 is measured by a current measuring means 122. The current measuring means controls a current generating means 126 by a control signal 124. The current generating means 126 draws a current out of the bottom resistor 12, which is made to flow into ground point 96. By design, the current drawn from resistor 12 by the current generating means is made equal to the current measured by the current measuring means. This will cause all the current flowing through resistor 12 to flow into ground point 96, and only current flowing through (G)MR head 14 will flow back into the bottom of the bias source 90.

The circuit topologies in FIGS. 4, 5A, and 5B are intended to illustrate specific implementations of test conditions. Other topologies, such as using a test current and measuring voltage, or other well-known measurement methods such as using a four-point resistance measurement where a current is forced through the device with two probing points and the voltage across it is measured with two different probing points, are also possible. The illustrations also do not address non-idealities such as bias source series resistance, op-amp source current limitations, op-amp input voltage range, op-amp input offset voltage and input bias current. Such non-idealities require additional circuit design techniques such as appropriate component choice, use of output buffers on the op-amp, etc. which are obvious to those skilled in the art.

Various different materials can be used for manufacturing the shunt resistors that make up the low resistance bypass. Common materials for thin-film resistors in the integrated circuit industry are tantalum (Ta), nickel-chromium (NiCr), and cermet (CrSiO). These materials are often used for their low temperature coefficient of resistance (TCR). In this application, a low TCR may not be important, so other readily available materials such as nickel or nickel-iron could be used. The resistance of a thin-film resistor is given by:

$$R = \rho \frac{l}{t \cdot w}$$

where ρ is the resistivity of the material, l is the length of the resistor, t is the thickness, and w is the width. For a given deposited thickness, the resistivity is often quoted as a sheet resistivity (resistivity divided by the material thickness), with units of ohms per square. As an example, nickel has a resistivity of $10 \times 10^{-6}$ Ohm*cm. If a 0.5 micron thick layer of nickel is deposited, the sheet resistance is 0.2 Ohms/square. This means that achieving a 5 Ohm resistance would require a length-to-width ratio of 25, which is a very reasonably achieved number.

Since the desired shunt low resistance bypass value is low, care must be taken in the design of the interconnects to ensure that the leads connecting to the resistor do not add significant a extra resistance.

In the present invention, the total resistance from all resistors is designed to be a specific value, which is substantially less than the minimum (G)MR head resistance value, but is also substantially greater than zero. The resistors are also designed to be capable of carrying large amounts of current, which would happen in the case of electrical discharge (ESD) or electrical overstress (EOS). However, the resistors need not have equal resistance values.

Figure 6:
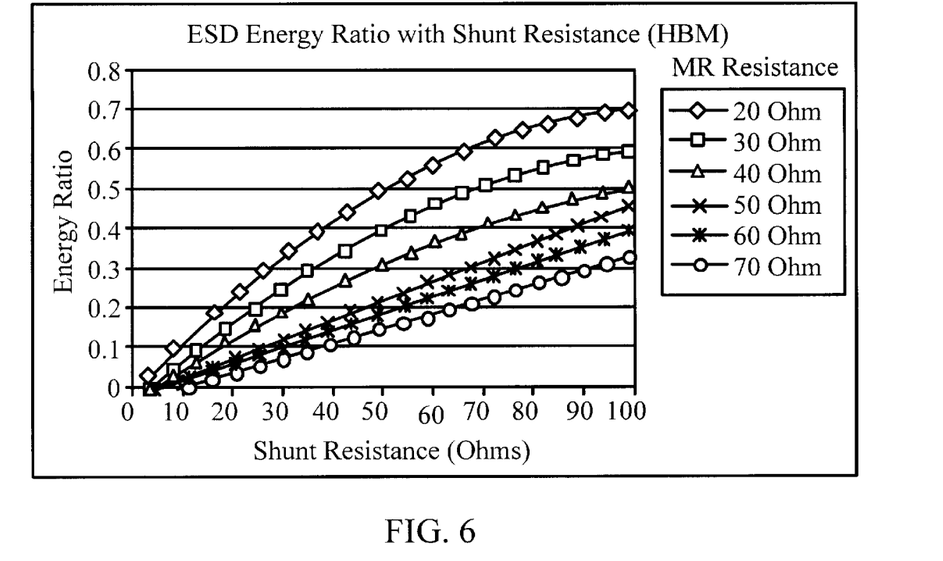
FIG. 6 is a graph showing ESD Energy Ratio versus Shunt Resistance in a Human Body Model.

While the ESD protection capability of a nonzero shunt resistance is not as good as that of a short circuit across the (G)MR head, it is capable of significantly reducing the ESD sensitivity of the (G)MR head. FIG. 6 shows the ESD Energy Ratio for a range of (G)MR head resistance values for different shunt resistance values, assuming a human body model (HBM) ESD circuit. In the HBM, which is intended to simulate human contact with the device under test, a 100 pF capacitor is charged to the target ESD voltage and discharged into the device under test through 1500 Ohm resistor. The energy ratio is defined as:

$$R = \frac{E_p}{E_U}$$

where $E_u$ is the total electrical energy dissipated in an unprotected (G)MR head during an ESD event, and $E_p$ is the energy dissipated in an (G)MR head protected with a shunt resistance. For the human body model, the above ratio can be analytically expressed as:

$$R = \left(\frac{R_s}{R_s + R_h}\right)^2$$

where $R_s$ is the shunt resistance value, and $R_h$ is the head resistance value. Note that in the case where the shunt resistance value approaches infinity (no shunt resistor) the ratio equals one, while in the limiting case of zero value shunt resistance (a perfect short) the ratio becomes zero.

Figure 7:
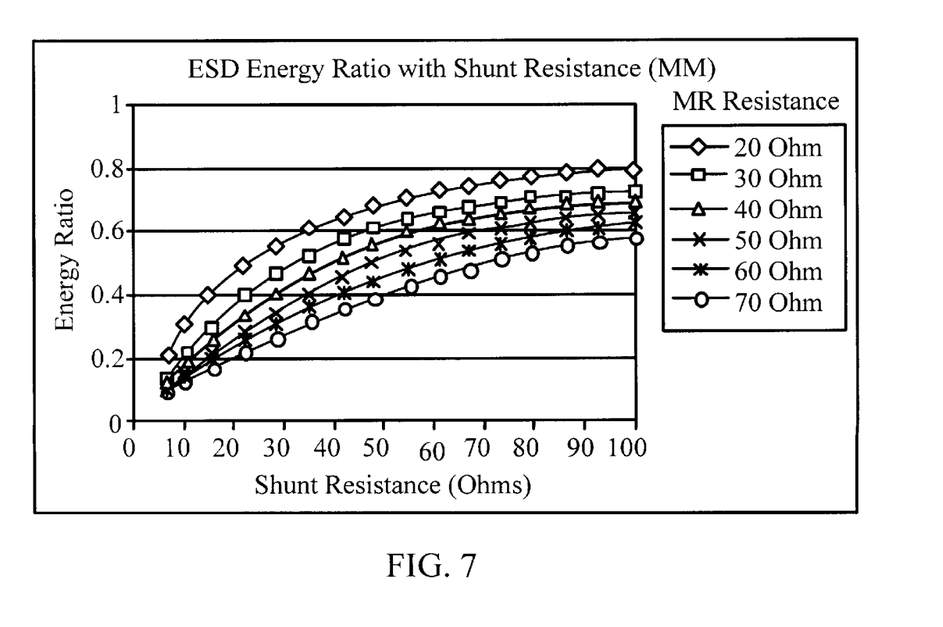
FIG. 7 is a graph showing ESD Energy Ratio versus Shunt Resistance in a Machine Model.

FIG. 7 shows the same type of graph as FIG. 6, except in this case the machine model (MM) circuit is used. The MM simulates a charged body of metal coming into contact with the device under test. In the MM test, a 200 pF capacitor is discharged directly into the device being tested. Since there is no 1500 Ohm series resistance, the discharge does not behave as a current source. In the MM case, the expression for the ESD energy ratio becomes:

$$R = \frac{R_S}{R_S + R_h}$$

Due to the elimination of the square in the expression, the energy ratio does not fall off as rapidly with decreasing shunt resistance value as in the HBM case.

In each case, for shunt resistance values of around 5 Ohms, the energy dissipation in the (G)MR head during an ESD event is reduced to 20% or less of the unprotected case.

What is claimed is:

1. A magnetoresistive head assembly comprising:
    a magnetoresistive sensor element;
    a low resistance element electrically coupled in parallel with the magnetoresistive sensor element for providing a low resistance conductive path bypassing the magnetoresistive sensor element for discharging static electrical charge; and
    a first electrically conductive pad, a second electrically conductive pad, and a third electrically conductive pad; wherein the low resistance element comprises a first resistor connected in series with a second resistor, and wherein the first conductive pad provides a first probing point between the first resistor and the magnetoresistive sensor element, the second conductive pad provides a second probing point between the second resistor and the magnetoresistive sensor element, and the third conductive pad provides a third probing point between the first resistor and the second resistor whereby the magnetoresistive sensor element be able to test at one or more stages in the manufacturing process.

2. A magnetoresistive head assembly as claimed in claim 1 wherein the low resistance element i s configured to be removable.

3. A magnetoresistive head assembly as claimed in claim 1 wherein the low resistance element is fabricated integrally with the magnetoresistive head assembly.

4. A magnetoresistive head assembly as claimed in claim 1 wherein at least one of the first and second resistors a thin film resistor.

5. A magnetoresistive head assembly as claimed in claim 4 wherein the thin film resistor is formed of a material from a group consisting of silicon, tantalum, nickel-chromium, cermet, nickel, and nickel iron.

6. A magnetoresistive head assembly as claimed in claim 1 wherein the low resistance element has a resistance within the range of 2 ohms to 40 ohms.

7. A method for manufacturing a magnetoresistive head assembly while protecting a magnetoresistive sensor element in the magnetoresistive head assembly from damage caused by electrostatic discharge (ESD) and/or electrical overstress (ESO) during fabrication and handling of the magnetoresistive head assembly, the method comprising the steps of:
    a) electrically connecting a low resistance element in parallel with the magnetoresistive sensor element and so providing a low resistance conductive path bypassing the magnetoresistive sensor element for discharging static electrical charge, wherein the low resistance element comprises a first resistor connected in series with a second resistor;
    b) providing first, second and third electrically conductive pads, wherein the first conductive pad provides a first probing point between the first resistor and the magnetoresistive sensor element, the second conductive pad provides a second probing point between the second resistor and the magnetoresistive sensor element, and the third conductive pad provides a third probing point between the first resistor and the second resistor;

c) testing the magnetoresistive sensor element via the conductive pads; and d) removing the low resistance conductive element at a desired process or assembly step prior to the completion of the assembly process.

8. The method of claim 7 wherein the low resistance element is fabricated integrally with the magnetoresistive head assembly.

9. The method of claim 7 wherein at least one of the resistors comprises a thin film resistor.

10. The method of claim 9 wherein the thin film resistor is formed of a material from a group consisting of silicon, tantalum, nickel-chromium, cermet, nickel, and nickel iron.

11. The method of claim 7 wherein the low resistance element is removed from across the magnetoresistive sensor element by thermal fuses.

12. The method of claim 7 wherein the low resistance element is removed from across the magnetoresistive sensor element by laser link cut.

13. The method of claim 7 wherein the low resistance element is removed from across the magnetoresistive sensor element by chemical or sputter etching process.

14. A method for testing a magnetoresistive sensor element in a magnetoresistive head assembly, the head assembly comprising:

the magnetoresistive sensor element;

a first resistor connected in series with a second resistor to form a resistor bypass, the resistor bypass being connected in parallel with the magnetoresistive sensor element to provide protection to the magnetoresistive sensor element against electrostatic discharge; and a first electrically conductive pad, a second electrically conductive pad, and a third electrically conductive pad, wherein the first conductive pad provides a first probing point between the first resistor and the magnetoresistive sensor element, the second conductive pad provides a second probing point between the second resistor and the magnetoresistive sensor element, and the third conductive pad provides a third probing point between the first resistor and the second resistor, the method comprising:

connecting a voltage source between the first pad and the second pad and connecting the second pad to ground;

connecting the non-inverting input of an operational amplifier to the first conducting pad;

connecting the inverting input of the operational amplifier to the third conducting pad;

connecting the output of the operational amplifier to the third conductive pad and thereby forcing the voltage at the third conductive pad to equal the voltage at the first conductive pad so that the current in the first resistor is zero; and measuring the test current output of the voltage source.

15. The method as claimed in claim 14 wherein the polarity of the voltage source is such that the first pad is at a negative voltage relative to ground and wherein the current into the voltage source is measured.

16. A method for testing a magnetoresistive sensor element in a magnetoresistive head assembly, the head assembly comprising:

the magnetoresistive sensor element;

a first resistor connected in series with a second resistor to form a resistor bypass, the resistor bypass being connected in parallel with the magnetoresistive sensor element to provide protection to the magnetoresistive element against electrostatic discharge; and a first electrically conductive pad, a second electrically conductive pad, and a third electrically conductive pad, wherein the first conductive pad provides a first probing point between the first resistor and the magnetoresistive sensor element, the second conductive pad provides a second probing point between the second resistor and the magnetoresistive sensor element, and the third conductive pad provides a third probing point between the first resistor and the second resistor, the method comprising:

connecting a floating; voltage source between the first pad and the second pad so that the first pad is at a positive voltage relative to the second pad;

connecting the non-inverting input of an operational amplifier to the first pad;

connecting the inverting input of the operational amplifier to the third pad;

connecting the output of the operational amplifier to the third pad and thereby forcing the voltage at the third pad to equal the voltage at the first pad so that the current in the first resistor is zero;

using a current measuring means for measuring the output current from the output of the operational amplifier and for generating a control signal related to the output current;

applying the control signal to a current generating means connected between the second pad and ground so that the current source provides a current to ground that equals the output current of the operational amplifier; and measuring the test current form the voltage source to the first pad.

17. A method for testing a magnetoresistive sensor element in a magnetoresistive head assembly, the head assembly comprising:

the magnetoresistive sensor element;

a first resistor, a second resistor, and a third resistor connected in series to form a resistor bypass, the resistor bypass being connected in parallel with the magnetoresistive sensor element to provide protection to the magnetoresistive sensor element against electrostatic discharge; and a first electrically conductive pad, a second electrically conductive pad, a third electrically conductive pad, and a fourth electrically conductive pad, wherein the first conductive pad provides a first probing point between the first resistor and the magnetoresistive sensor element, the second conductive pad provides a second probing point between the second resistor and the magnetoresistive sensor element, the third conductive pad provides a third probing point between the first resistor and the third resistor, and the fourth conductive pad provides a fourth probing point between the second resistor and the third resistor, the method comprising:

connecting a floating voltage source between the first pad and the second pad so that the first pad is at a positive voltage relative to the second pad;

connecting a first operational amplifier having a non-inverting input connected to the first pad, an inverting input connected to the third conducting pad and having an output connected to the third conducting pad so that the current through the first resistor is zero;

connecting a second operational amplifier having a non-inverting input connected to second conductive pad, an inverting input connected to the fourth conductive pad and an output connected to the fourth conductive pad so that the current in the second resistor is zero; and measuring the test current between the voltage source and the first pad.

* * * * *